(12) United States Patent
Hihara

(10) Patent No.: US 11,760,278 B2
(45) Date of Patent: Sep. 19, 2023

(54) VEHICLE SIDE STRUCTURE

(71) Applicant: TOYOTA JIDOSHA KABUSHIKI KAISHA, Toyota (JP)

(72) Inventor: Yasuyuki Hihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/844,792

(22) Filed: Jun. 21, 2022

(65) Prior Publication Data

US 2022/0410982 A1 Dec. 29, 2022

(30) Foreign Application Priority Data

Jun. 23, 2021 (JP) ................................. 2021-103932

(51) Int. Cl.
*B60R 13/04* (2006.01)
*B62D 25/02* (2006.01)
*B62D 27/02* (2006.01)

(52) U.S. Cl.
CPC ............ *B60R 13/04* (2013.01); *B62D 25/025* (2013.01); *B62D 27/02* (2013.01)

(58) Field of Classification Search
CPC ...... B60R 13/04; B62D 25/025; B62D 27/02; B62D 27/023

USPC ............................... 296/209, 1.08, 136.01, 7
See application file for complete search history.

(56) References Cited

U.S. PATENT DOCUMENTS

| 2009/0167010 | A1* | 7/2009 | Rompage | ................ B60R 13/06 280/847 |
| 2011/0027522 | A1* | 2/2011 | Kubo | ...................... B60R 13/04 428/99 |
| 2018/0346033 | A1 | 12/2018 | Watanabe et al. | |

FOREIGN PATENT DOCUMENTS

| JP | 2018-203078 A | 12/2013 |
| JP | 2019-25967 A | 2/2019 |
| JP | 2019-73122 A | 5/2019 |

\* cited by examiner

*Primary Examiner* — Dennis H Pedder
(74) *Attorney, Agent, or Firm* — Dinsmore & Shohl LLP

(57) ABSTRACT

A rocker panel molding includes an outer panel including a front integral hinge that is bendable along a first straight line extending along a vehicle length on a lower end of a front portion of the outer panel and a rear integral hinge that is bendable along a second straight line extending along the vehicle length on a lower end of a rear portion of the outer panel, a front foldable panel configured to be folded at the front integral hinge and fixed to a rocker panel, and a rear foldable panel configured to be folded at the rear integral hinge and fixed to the rocker panel.

4 Claims, 6 Drawing Sheets

VEHICLE SIDE STRUCTURE

CROSS REFERENCE TO RELATED APPLICATION

This application claims priority to Japanese Patent Application No. 2021-103932 filed on Jun. 23, 2021, which is incorporated herein by reference in its entirety including the specification, claims, drawings, and abstract.

TECHNICAL FIELD

The present disclosure relates to a vehicle side structure including a rocker panel extending along a vehicle length between front and rear wheel wells under a side face of a vehicle, and a rocker panel molding fixed to the rocker panel to cover the exterior of the rocker panel in the vehicle width direction and the underside of the rocker panel.

BACKGROUND

JP 2018-203078 A discloses a vehicle side structure including a side sill (rocker panel) extending along the vehicle length between front and rear wheel wells under a vehicle side face, and a side sill garnish (rocker panel molding) fixed to the side sill to cover the exterior of the side sill in the vehicle width direction and the underside of the side sill. The side sill garnish has a lower end portion that forms a straight line extending along the vehicle length when viewed from the exterior in the vehicle width direction.

SUMMARY

A rocker panel molding that covers the exterior of a rocker panel in the vehicle width direction and the underside of the rocker panel may include an outer panel that covers the exterior of the rocker panel and a foldable panel to be folded inward in the vehicle width direction at an integral hinge disposed on a lower end of the outer panel. The outer panel and the foldable panel may be integrally molded to form the rocker panel molding. Specifically, such a rocker panel molding includes an integral hinge having a reduced thickness in a linear shape between the outer panel and the foldable panel, and the rocker panel molding is molded by pouring a resin between molds with the integral hinge being unbent, and, after being removed out of the molds, the molded rocker panel molding is deformed such that the foldable panel is folded at the integral hinge and then fixed to the rocker panel.

As described above, to form the rocker panel molding by integrally molding the outer panel and the foldable panel, the foldable panel is not bent at the integral hinge in the stage of pouring a resin between the molds for molding, and, after the rocker panel molding is removed out of the molds, the foldable panel is deformed by bending at the integral hinge. The rocker panel molding is formed in this manner to avoid a resin from being poured between the molds with the integral hinge in a bent state and molded into a shape surrounding one of the molds, which inhibits removal of the molded rocker panel molding.

Such a rocker panel molding, however, includes a linear integral hinge that is bendable along a straight line extending along the vehicle length over the entire lower end of the outer panel, and this configuration limits the shape of the outer panel to a design having a linear lower end extending along the vehicle length when viewed from the exterior of the vehicle. This prohibits the outer panel of the rocker panel molding from having, for example, a curved lower end when viewed from the exterior of the vehicle, restricting the degree of freedom of a design of the rocker panel molding.

An embodiment of the disclosure is therefore aimed at providing a vehicle side structure including a rocker panel molding with an increased degree of freedom of design.

According to the disclosure, a vehicle side structure includes a rocker panel extending along a length of a vehicle under a side face of the vehicle between front and rear wheel wells, and a rocker panel molding fixed to the rocker panel to cover an exterior of the rocker panel in a vehicle width direction and an underside of the rocker panel. The rocker panel molding includes an outer panel fixed to the exterior of the rocker panel and including a front integral hinge that is bendable along a first straight line extending along the vehicle length on a lower end of a front portion of the outer panel and a rear integral hinge that is bendable along a second straight line extending along the vehicle length on a lower end of a rear portion of the outer panel, a front foldable panel connected integrally with the outer panel and configured to be folded at the front integral hinge and fixed to the rocker panel, and a rear foldable panel connected integrally with the outer panel and configured to be folded at the rear integral hinge and fixed to the rocker panel. The front integral hinge and the rear integral hinge are disposed at different heights.

The vehicle side structure including the front integral hinge and the rear integral hinge at different heights on the outer panel of the rocker panel molding has a higher degree of freedom of design of the rocker panel molding than the vehicle side structure including the rocker panel molding having a single integral hinge disposed over the entire lower end of the outer panel.

In one aspect of the vehicle side structure of the disclosure, the front foldable panel may be fixed to the rear foldable panel with the front foldable panel being partially superposed on part of the rear foldable panel.

This configuration can increase rigidity of the rocker panel molding.

In one aspect of the vehicle side structure according to the disclosure, the lower end of the outer panel may have a curved shape between the front integral hinge and the rear integral hinge when viewed from the exterior of the vehicle.

This configuration allows the lower end of the outer panel to have a curved shape when viewed from the exterior of the vehicle.

The disclosure provides a vehicle side structure including a rocker panel molding with an increased degree of freedom of design.

BRIEF DESCRIPTION OF DRAWINGS

Embodiments of the present disclosure will be described based on the following figures, wherein.

DESCRIPTION OF EMBODIMENTS

A vehicle side structure 10 according to an embodiment of the disclosure will be described by reference to the drawings. In each of the drawings, an arrow FR, an arrow UP, and an arrow RH indicate forward (travelling direction), upward, and rightward of the vehicle, respectively. Directions opposite to the arrows FR, UP, and RH indicate rearward, downward, and leftward of the vehicle, respectively. In the following description, when the front and rear, the left and right, and upper and lower directions are simply referred to, these directions indicate the front and rear along the vehicle length, the left and right along the vehicle width, and the upper and lower directions along the vehicle height, respectively, unless otherwise specified.

Figure 1:
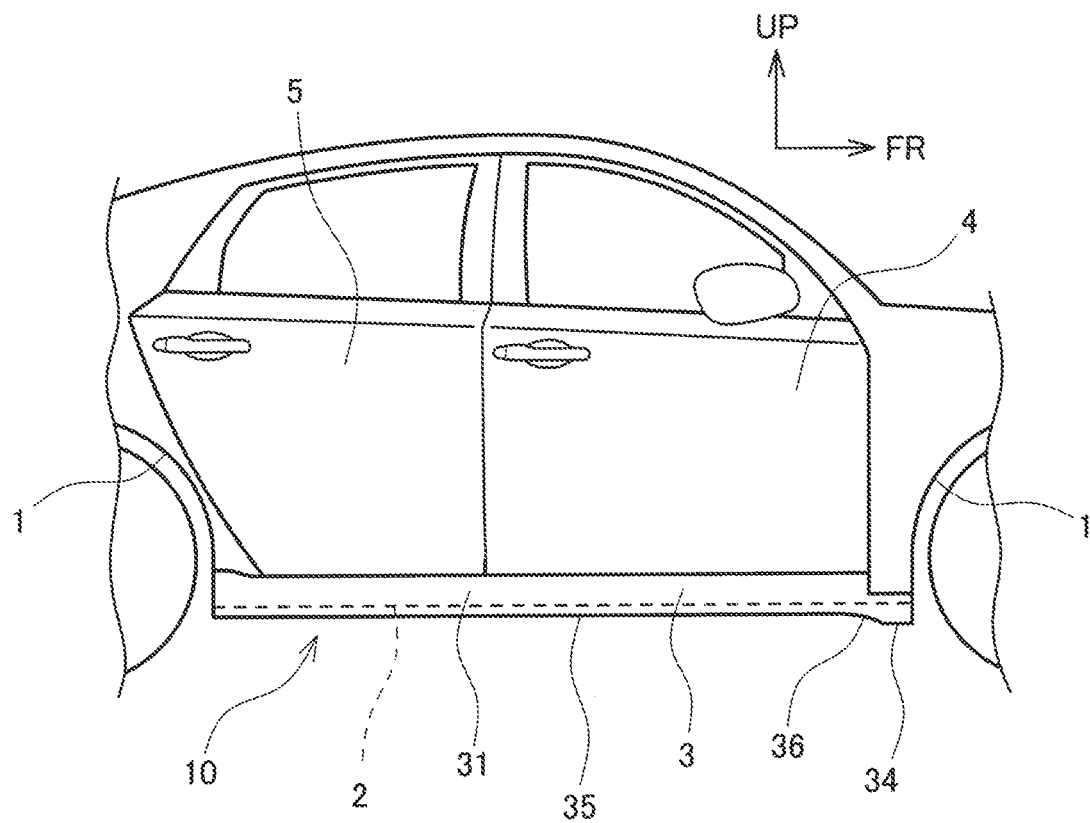
FIG. 1 is a side view of a vehicle side structure according to an embodiment of the disclosure viewed from the exterior in a vehicle width direction.

FIG. 1 is a side view of the vehicle side structure 10 according to the present embodiment viewed from the exterior in the vehicle width direction, and illustrates the right side of the vehicle side structure 10. The vehicle side structure 10 includes a rocker panel 2 disposed under a vehicle side face and extending between front and rear wheel wells 1, and a rocker panel molding 3 fixed to the rocker panel 2 to cover the exterior of the rocker panel 2 in a vehicle width direction and an underside of the rocker panel 2. The rocker panel 2 and the rocker panel molding 3 are disposed under a front door 4 and a rear door 5 on the vehicle side face. The rocker panel molding 3 is a resin decorative member that protects the rocker panel 2 from gravel or the like bouncing up during travelling of the vehicle. As illustrated in FIG. 1, the rocker panel 2, when viewed from the exterior of the vehicle, is located behind the rocker panel molding 3 and is not therefore visible.

Figure 2:
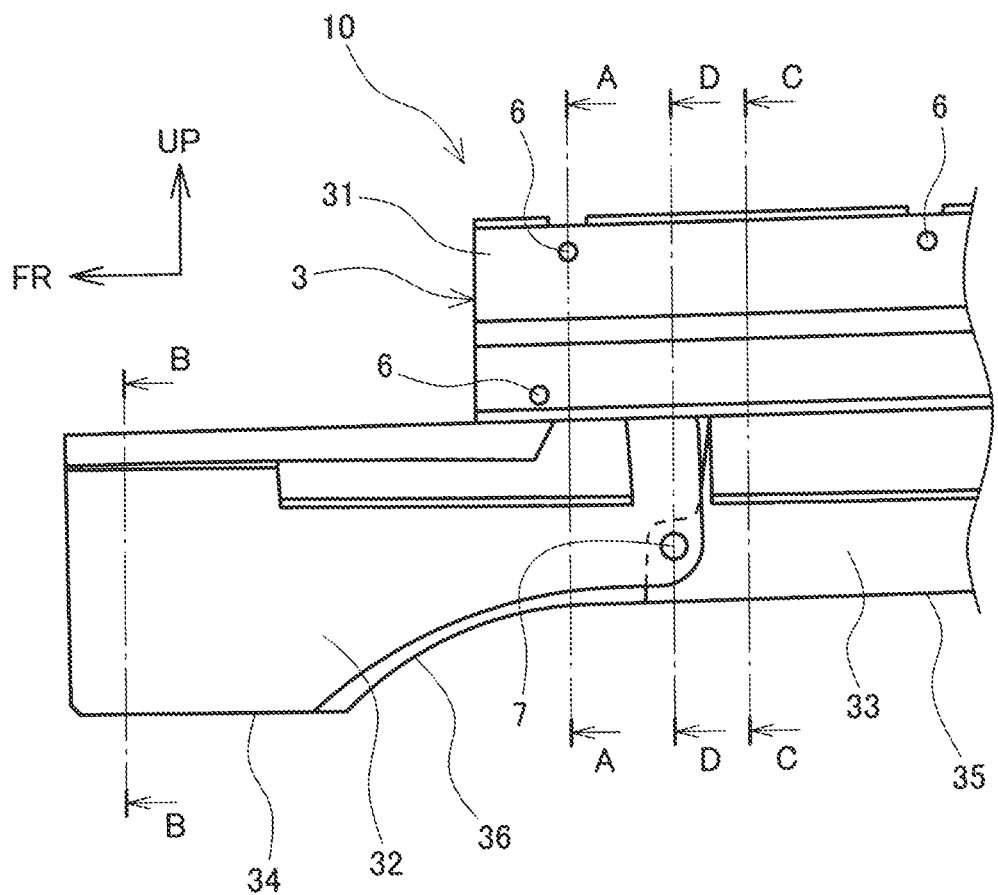
FIG. 2 is a side view of a front portion of the rocker panel molding viewed from the interior in the vehicle width direction.

FIG. 2 is a side view of a front portion on the right side of the rocker panel molding 3 illustrated in FIG. 1 when viewed from the interior of the vehicle in the width direction. As illustrated in FIG. 2, the rocker panel molding 3 includes an outer panel 31, a front foldable panel 32, and a rear foldable panel 33. The front foldable panel 32 is connected with the outer panel 31 via a front integral hinge 34, and the rear foldable panel 33 is connected with the outer panel 31 via a rear integral hinge 35. The outer panel 31, the front foldable panel 32, and the rear foldable panel 33 are integrally molded by pouring a resin between molds.

Figure 3:
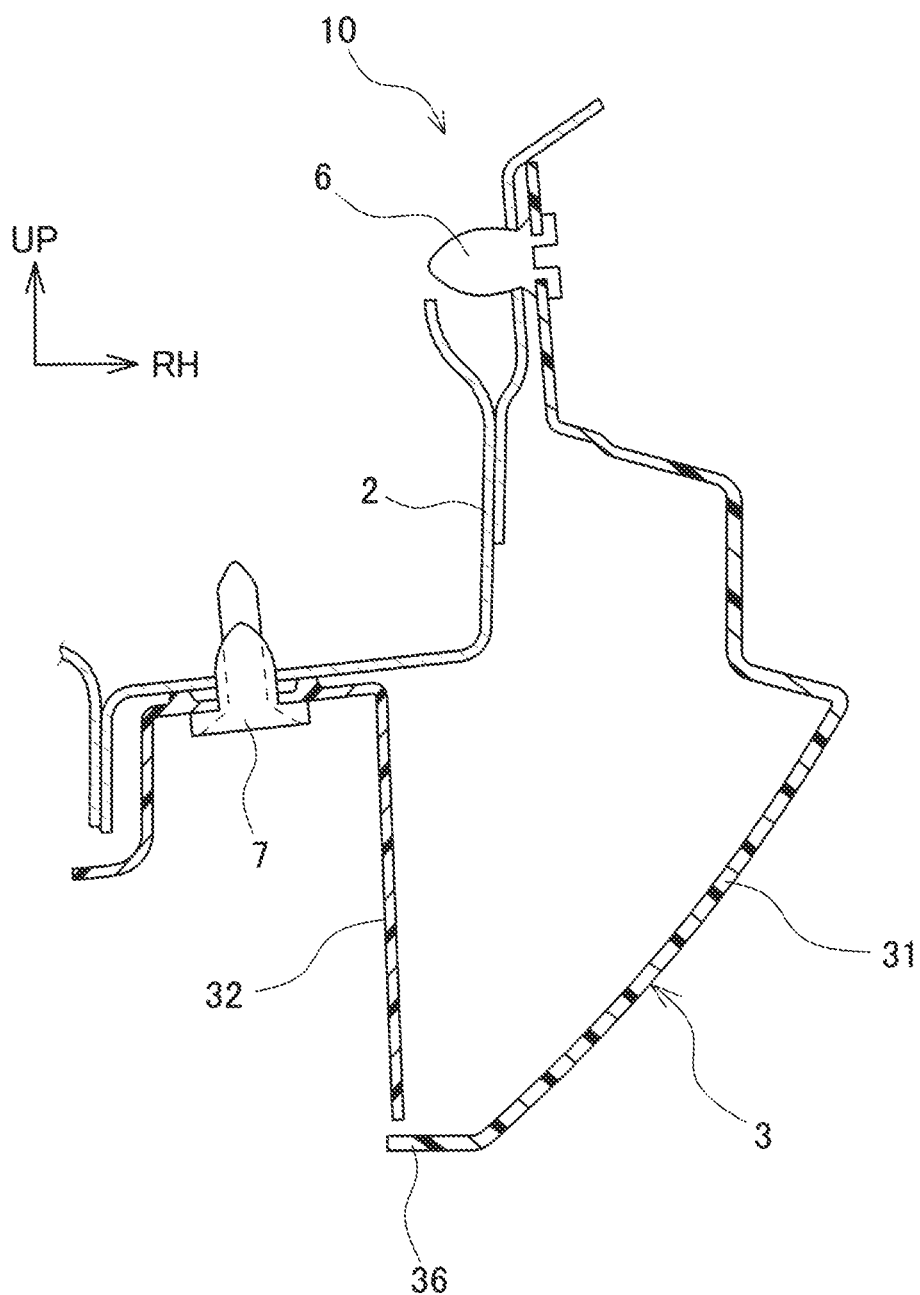
FIG. 3 is a cross sectional view taken along A-A line in FIG. 2.

As illustrated in FIG. 1 and FIG. 2, the front integral hinge 34 that is a bendable along a first line extending along the vehicle length is disposed on a lower end of the front portion of the outer panel 31. In a portion further rearward of the front integral hinge 34, the rear integral hinge 35 that is bendable along a second line extending along the vehicle length is disposed on the lower end of the outer panel 31. The front integral hinge 34 is located at a level that is lower than the rear integral hinge 35. A curved portion 36 that forms a curved line when viewed from the exterior in the vehicle width direction is disposed on the lower end of the outer panel 31 between the front integral hinge 34 and the rear integral hinge 35. The curved portion 36 is curved further downward as it extends forward from a front end of the rear integral hinge 35 to a rear end of the front integral hinge 34. The outer panel 31 is fixed to the exterior of the rocker panel 2 in the vehicle width direction with a clip 6, as illustrated in FIG. 3. While FIG. 2 only illustrates the rocker panel molding 3 and does not illustrate the rocker panel 2, the cross sectional views in FIG. 3 and FIG. 5 partially show the rocker panel 2 to indicate how the rocker panel molding 3 is fixed to the rocker panel 2.

Figure 4:
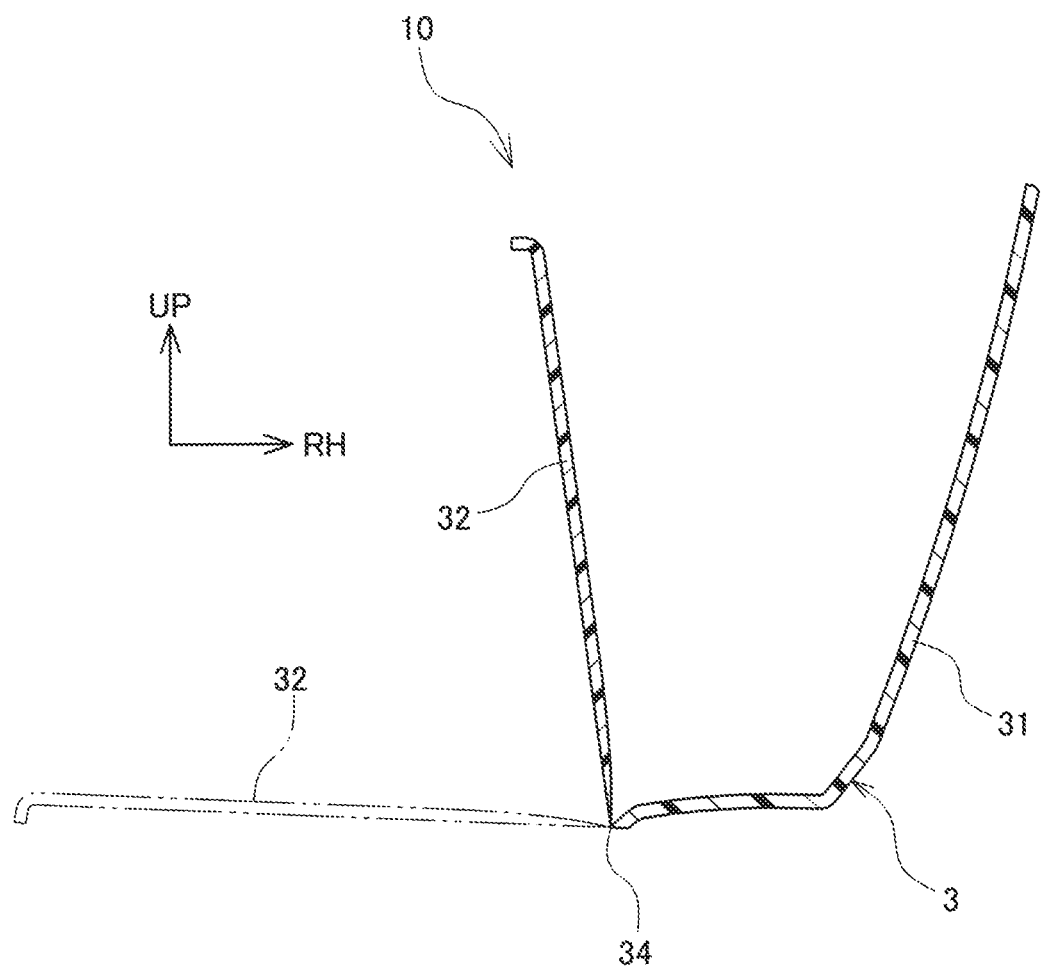
FIG. 4 is a cross sectional view taken along B-B line in FIG. 2.

The front foldable panel 32 is molded integrally with the outer panel 31 in the position outlined by a double-dotted line in FIG. 4, and during assembly the front foldable panel 32 is folded at the front integral hinge 34 to the position indicated in FIG. 4 by a solid line. More specifically, at the time of molding the rocker panel molding 3 by pouring a resin between molds, the front foldable panel 32 is molded in an opened state in the position as indicated by the double-dotted outline in FIG. 4. Then, after the rocker panel molding 3 is removed out of the molds, the front foldable panel 32 is folded at the front integral hinge 34 into the position outlined with a solid line in FIG. 4, and is fixed to the rocker panel 2 with a clip 7 as illustrated in FIG. 3. As illustrated in FIG. 4, the front integral hinge 34 is thinner than the outer panel 31 and the front foldable panel 32. The front foldable panel 32, when folded at the front integral hinge 34, is not connected with the outer panel 31 in the curved portion 36 of the outer panel 31 such that a space is formed between the front foldable panel 32 and the outer panel 31, as illustrated in FIG. 3.

Figure 5:
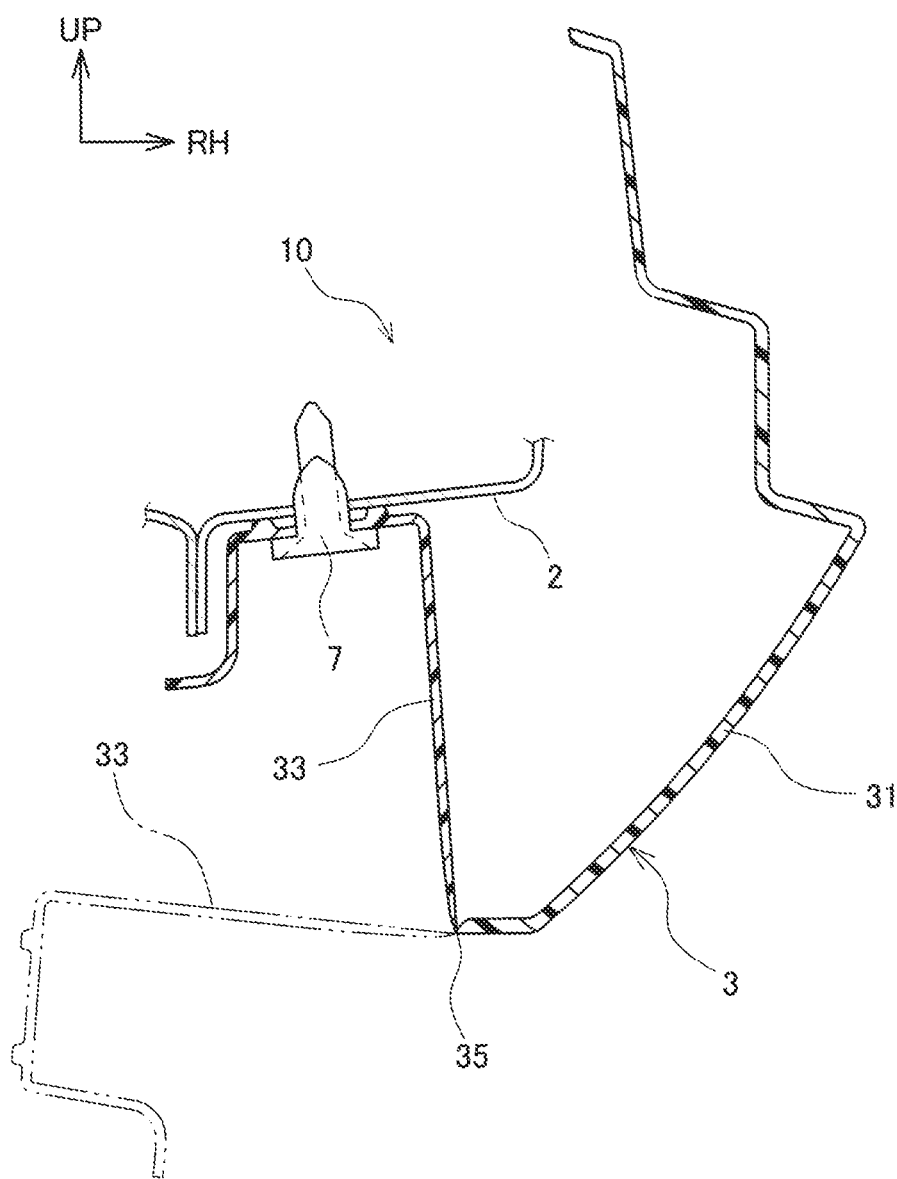
FIG. 5 is a cross sectional view taken along C-C line in FIG. 2.

The rear foldable panel 33 is molded integrally with the outer panel 31 in the position indicated by the double-dotted line in FIG. 5, and during assembly the rear foldable panel 33 is folded at the rear integral hinge 35 to the position indicated in FIG. 5 by a solid line. More specifically, at the time of molding the rocker panel molding 3 by pouring a resin between molds, the rear foldable panel 33 is molded in an opened state in the position as indicated by the double-dotted outline in FIG. 5. Then, after the rocker panel molding 3 is removed out of the molds, the rear foldable panel 33 is folded at the rear integral hinge 35 into the position outline with a solid line in FIG. 5, and then fixed to the rocker panel 2 with the clip 7 as illustrated in FIG. 5. As illustrated in FIG. 5, the rear integral hinge 35 is thinner than the outer panel 31 and the rear foldable panel 33.

Figure 6:
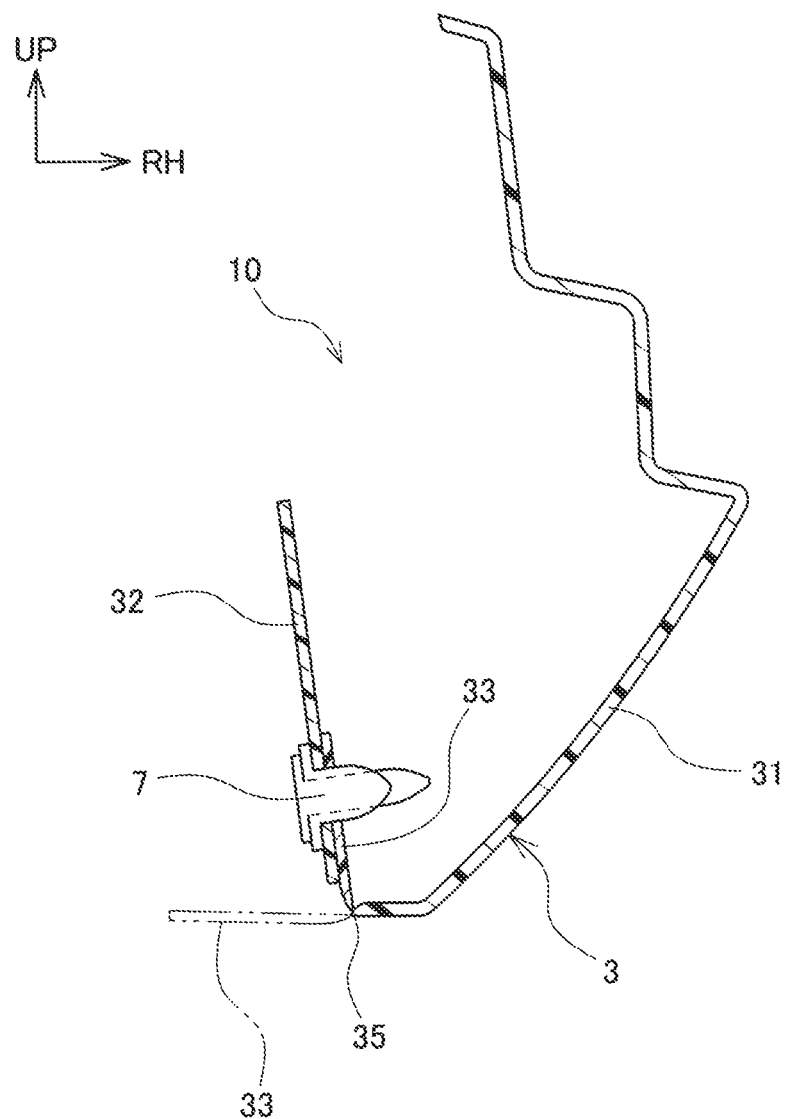
FIG. 6 is a cross sectional view taken along D-D line in FIG. 2.

Further, as illustrated in FIG. 2 and FIG. 6, the front foldable panel 32 is fixed to the rear foldable panel 33 with the clip 7, with the front foldable panel 32 being partially superposed on part of the rear foldable panel 33.

The vehicle side structure 10 thus including the rocker panel molding 3 having the front integral hinge 34 and the rear integral hinge 35 disposed at different height levels on the outer panel 31 can include the curved portion 36 having a front end and a rear end at different heights on the lower end of the outer panel 31. This configuration of the vehicle side structure 10 increases the degree of freedom of design of the rocker panel molding 3 compared to a vehicle side structure including a rocker panel molding having a single integral hinge on the entire lower end. The vehicle side structure 10 including the curved portion 36 on the lower end of the outer panel 31 can contribute to a design giving an impression of a robust front wheel arch.

As described above, in the vehicle side structure 10, the outer panel 31, the front foldable panel 32, and the rear foldable panel 33 are each fixed to the rocker panel 2, and the front foldable panel 32 is partially superposed on part of the rear foldable panel 33 and is fixed to the rear foldable panel 33 with the clip 7. This configuration of the vehicle side structure 10 increases rigidity of the rocker panel molding 3.

Supplemental Embodiments

The vehicle side structure of the disclosure is not limited to the above example and may be implemented in various modes within the scope of the disclosure. For example, the lower end portion of the outer panel where the front integral hinge or the rear integral hinge is not disposed may have a shape other than that of the curved portion 36 when viewed from the exterior in the vehicle width direction. Further, the rear integral hinge may be shorter than the front integral hinge in the vehicle length direction. In addition, the outer panel, the front foldable panel, and the rear foldable panel may be fixed to the rocker panel with a structure other than a clip.

The invention claimed is:

1. A vehicle side structure comprising:
a rocker panel extending along a length of a vehicle under a side face of the vehicle between front and rear wheel wells; and
a rocker panel molding fixed to the rocker panel to cover an exterior of the rocker panel in a vehicle width direction and an underside of the rocker panel,
the rocker panel molding comprising:
an outer panel fixed to the exterior of the rocker panel, the outer panel including a front integral hinge that is bendable along a first straight line extending along the vehicle length on a lower end of a front portion of the outer panel and a rear integral hinge that is bendable along a second straight line extending along the vehicle length on a lower end of a rear portion of the outer panel;
a front foldable panel connected integrally with the outer panel, the front foldable panel configured to be folded at the front integral hinge and fixed to the rocker panel; and
a rear foldable panel connected integrally with the outer panel, the rear foldable panel configured to be folded at the rear integral hinge and fixed to the rocker panel,
wherein the front integral hinge and the rear integral hinge are disposed at different heights.

2. The vehicle side structure according to claim 1, wherein the front foldable panel is fixed to the rear foldable panel with the front foldable panel being partially superposed on part of the rear foldable panel.

3. The vehicle side structure according to claim 1, wherein the lower end of the outer panel has a curved shape between the front integral hinge and the rear integral hinge when viewed from the exterior of the vehicle.

4. The vehicle side structure according to claim 2, wherein the lower end of the outer panel has a curved shape between the front integral hinge and the rear integral hinge when viewed from the exterior of the vehicle.

* * * * *